Aug. 20, 1957 — L. F. CRABTREE — 2,803,192
ELECTRICAL CONTROL SYSTEM
Filed March 9, 1953 — 6 Sheets-Sheet 3

FIG. 3

INVENTOR.
LEONARD F. CRABTREE
ATTY.

Aug. 20, 1957 L. F. CRABTREE 2,803,192
ELECTRICAL CONTROL SYSTEM
Filed March 9, 1953 6 Sheets-Sheet 4

INVENTOR.
LEONARD F. CRABTREE
BY
ATTY.

Aug. 20, 1957

L. F. CRABTREE 2,803,192

ELECTRICAL CONTROL SYSTEM

Filed March 9, 1953

INVENTOR.
LEONARD F. CRABTREE

BY

ATTY.

United States Patent Office 2,803,192
Patented Aug. 20, 1957

2,803,192
ELECTRICAL CONTROL SYSTEM

Leonard F. Crabtree, Downers Grove, Ill., assignor to General Telephone Laboratories, Incorporated, a corporation of Delaware Application March 9, 1953, Serial No. 341,174

7 Claims. (Cl. 103—11)

The present invention relates to an electrical control system for automatically operating a plurality of electrical apparatus units in response to the operation of a plurality of pairs of contacts.

An object of my invention is to provide a control system for automatically starting a plurality of electrical apparatus units in a cyclic sequence in response to the closing of a plurality of pairs of contacts.

Another object of my invention is to provide an electrical control system for automatically stopping a plurality of electrical apparatus units in a cyclic sequence in response to the opening of the plurality of pairs of contacts.

A further object of my invention is to provide the above-mentioned automatic control system with means for changing the starting and stopping sequences.

My invention will appear more clearly and further advantages will become apparent from the following description when taken in conjunction with the drawings which show by way of example a preferred embodiment of the inventive idea.

Figures 4 and 5 are circuit diagrams of starters for the apparatus units, also shown are switches for the removal of the units from the control of the automatic system and other switches for the manual operation of the units.

The key to the arrangement of the drawings is shown in Figure 7, and it is to be noted that the hundreds digit of a reference character will indicate the figure in which that reference character appears.

Short description

Figures 4, 7:
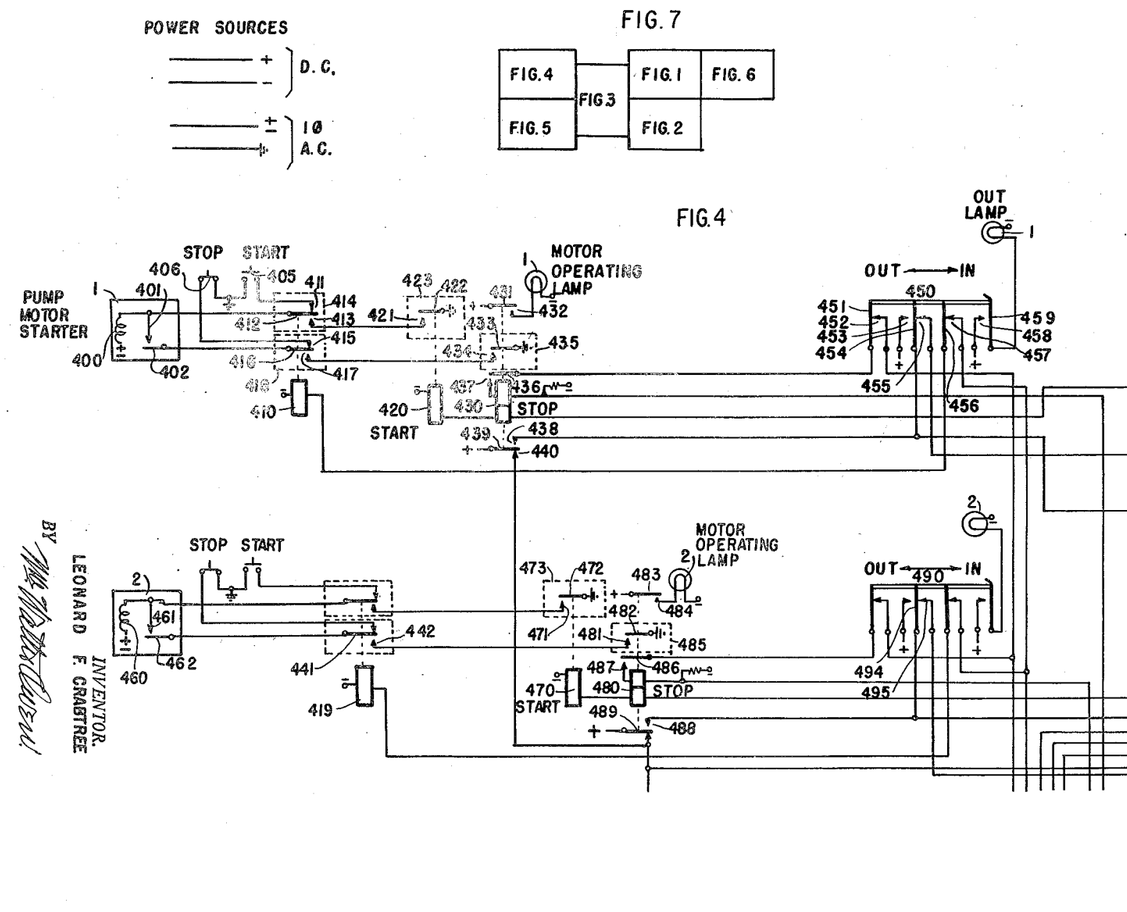
Figure 6:
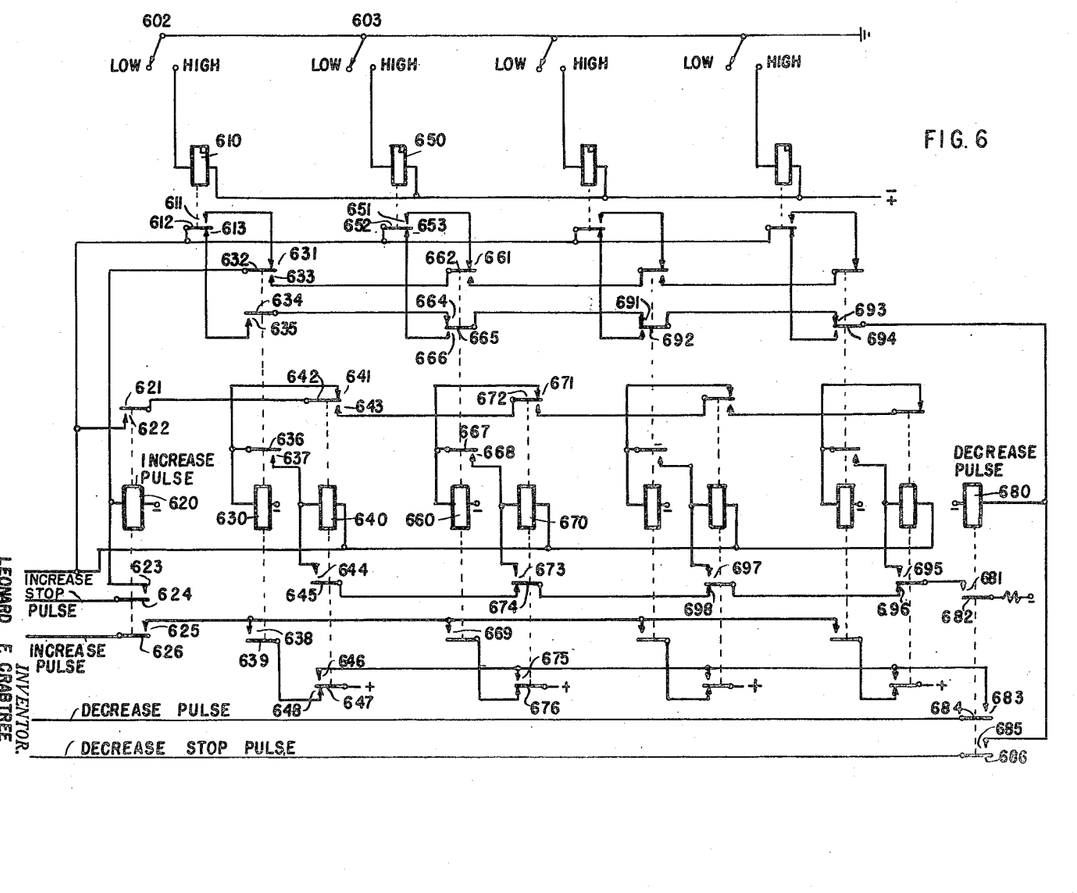
Figure 6 is a circuit diagram showing the plurality of contacts and the related circuits for starting and stopping the apparatus units.

In the below-described embodiment of my invention, an automatic control system is operatively connected to the starters, such as starter 400, of five water pump motors (previously referred to as apparatus units) which supply water to a common hydraulic system (not shown) having flow meter contacts such as 602, 603, etc. (previously referred to as the plurality of contacts) associated therewith. These motors can either be automatically or manually controlled.

In the hydraulic system there are a plurality of so-called flow meter contacts which may close successively as the demand for water increases and the system is designed to cut in additional pumps in a particular sequence as the demand increases and cut out pumps also in the same particular sequence as the demand decreases. Also means is provided for starting the sequence with any desired one of the pumps and for causing any of the pumps to be passed by and not included in the starting sequence if desired.

On automatic operation the motors will automatically start and stop in a pre-selected cyclic sequence in response to the closing and opening of the flow meter contacts, which operate in a fixed order. Any of the pump motors may be taken out of automatic service either before or during the automatic operation.

On manual operation the automatic control circuit is inoperative and the motors are entirely under the control of an operator.

The detailed description of both operations immediately follows.

Automatic operation

Figure 1:
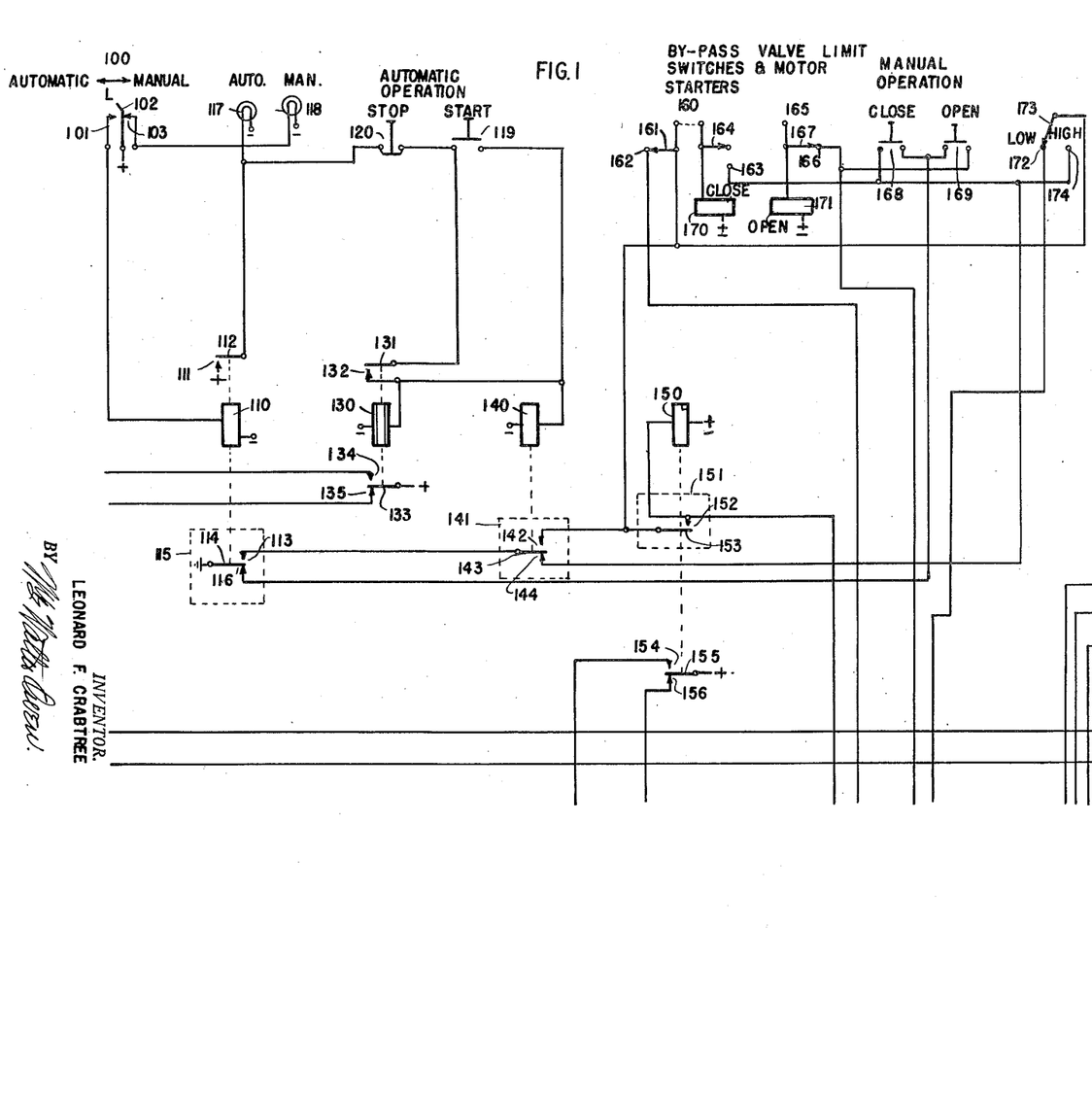
Figure 1 is a circuit diagram of the initiating circuits of the automatic control system.
Figure 2:
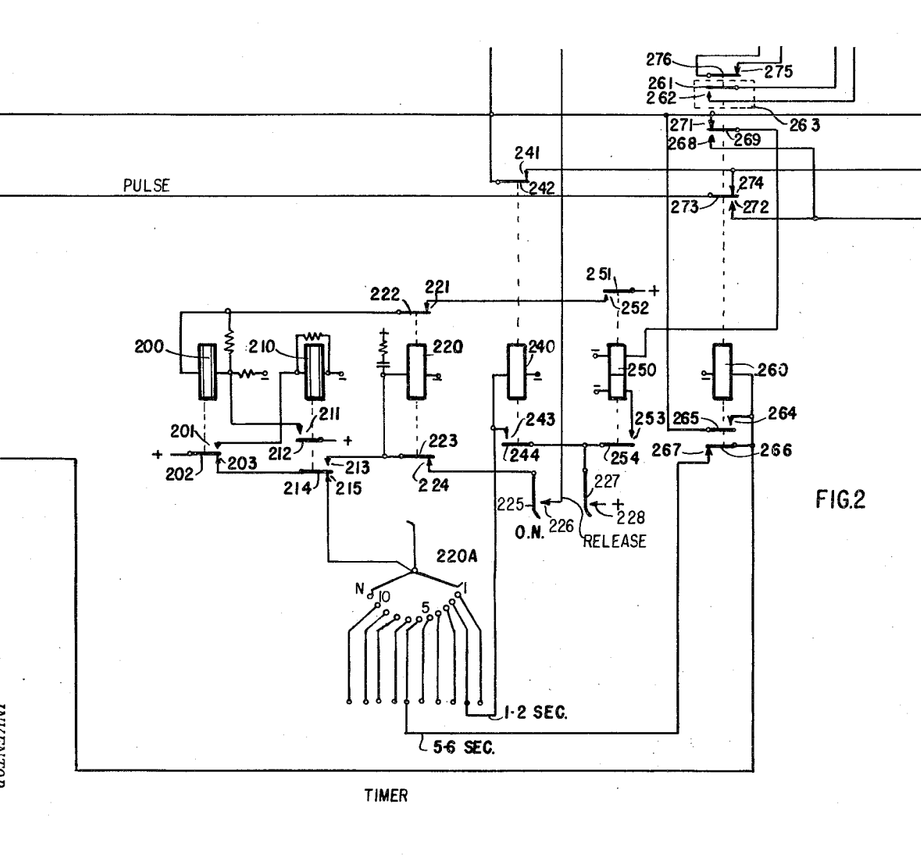
Figure 2 is a circuit diagram of a timer circuit that is integrated into the control system.

A motor actuated by-pass valve (not shown) is operatively associated with the hydraulic system to which my control system is applied, and before the pump motors are automatically operated this valve should first be closed. I have shown in Fig. 1 the "Close" and "Open" motor starters 170 and 171, respectively, which control this valve, and the limit switch 160 having contacts 161 and 162 closed when the by-pass valve is closed and the contacts 163 and 164 open when the valve is closed. Alternatively, if this valve is not already in the closed position it can be closed by placing key switch 100 in the "Manual" position and then depressing "Close" push-button switch 168, whereupon a circuit is closed from A. C. ground through contacts 114 and 116, switch 168, contacts 163 and 164 (if closed) of limit switch 160, and the "Close" motor starter 170 to the other side of the A. C. line. (It will be noted that the closing of switch 168 would be ineffectual if the by-pass valve was already in the closed position because contacts 163 and 164 would be opened as shown.) The operation of the motor-actuated by-pass valve and its limit switches will be further described in a cycle of automatic operation of the system hereinafter following.

The system can now be placed on automatic operation; push key 100 (Fig. 1) must first be moved to the "Automatic" position, thereby closing contacts 101 and 102 and extending positive battery to relay 110. Upon operating relay 110 effects the following circuit operations: via contacts 111 and 112 extends positive battery to, and lights, the green light 117 designated "Automatic" and also extends positive battery to the "Start" push-button 119 to prepare the starting circuit; and via contacts 113 and 114 of micro-switch 115 extends A. C. ground to contact 143 of micro-switch 141.

Figure 3:
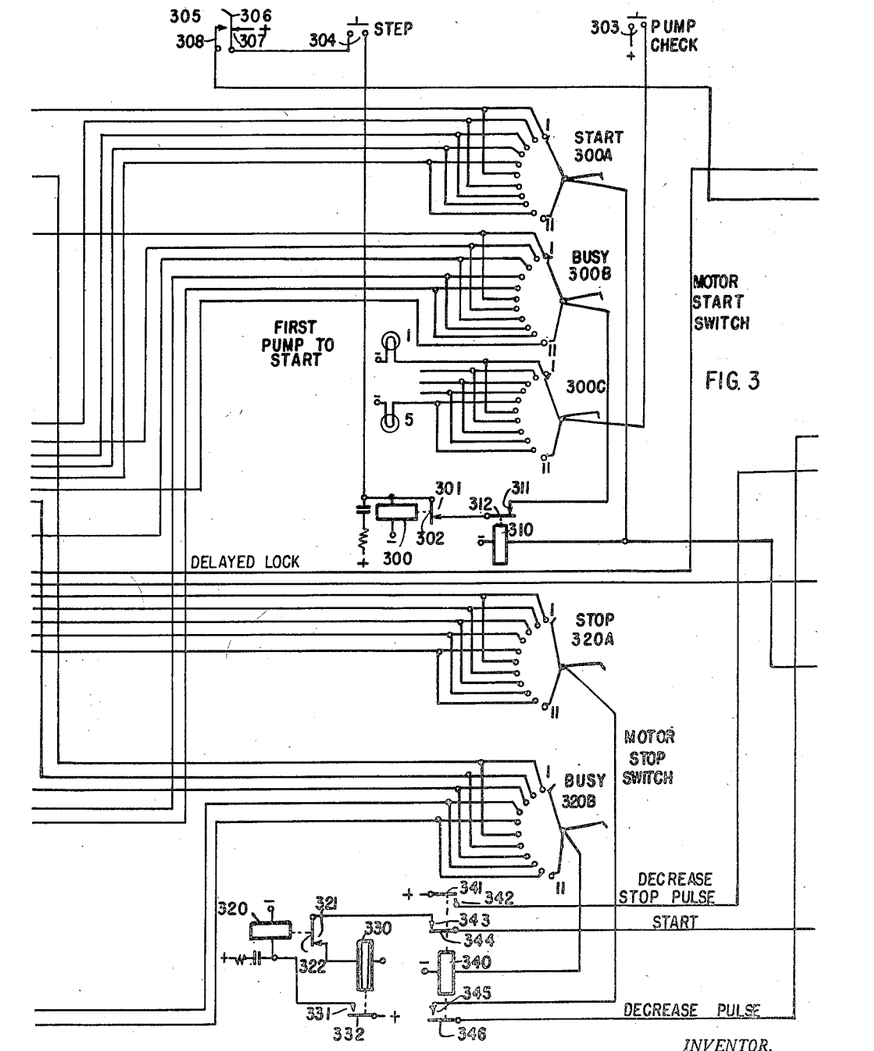
Figure 3 is a circuit diagram of the starting and stopping switches and their related circuits.

Before initiating automatic operation a visual check on the first pump motor which is presently connected up to be started may be made by observing a lighted lamp in a lamp panel; and if this motor is not the one desired to be started first, any one of the remaining four motors may be selected instead. This check may be made by depressing a push-button switch 303 (Fig. 3) designated "Pump Check," whereupon a lamp in a five lamp group corresponding to the respective motors and designated "First Pump to Start" will light by the extension of positive battery to the lamp via switch 303 and the wiper and related contact of bank 300C of the rotary stepping switch designated "Motor Start Switch" upon which the wiper may then be standing. If the lamp thus lighted indicates a motor not desired to be operated first, then push-button switch 304, designated "Step," may be momentarily depressed simultaneously with the "Pump Check" switch to energize motor magnet 300 and step the wipers of the "Motor Start Switch" to the next position. The stepping of this switch may be continued until the desired motor is found. As herein described motor 1 will be started first.

To initiate automatic operation the "Start" push-button switch 119 must be momentarily depressed, thereby closing a circuit from positive battery through contacts 111 and 112, switches 120 and 119 to the paralleled combination of slow-releasing relay 130 and relay 140; these relays operate and effect the following circuit operations: lock-up to positive battery via contacts 131 and 132; extend positive battery via contacts 133, 134, and the "Delayed Lock" lead through the five "Out-In" switches in the paralleled branches to energize the motor starter transfer relays 410, 419, 510, 520, and 530. Operation of relay 410 will only be described since each of these transfer relays operate alike and perform a similar function. Upon operating, relay 410 effects the following circuit operations: prepares an energizing circuit to motor starter 400 by transferring control of the starter from the manual control "Start" and "Stop" push-button switches 405, 406 to the automatic "Start" and "Stop" relay micro-switch contacts 421, 434, this is via closed contacts 412, 413 of micro-switch 414 and closed contacts 416, 417 of micro-switch 418. A. C. ground is extended to relay 150 via contacts 143, 142 of micro-switch 141 of relay 140, contacts 161, 162 of limit switch 160, and contacts 275, 276.

Upon operating, relay 150 locks up to its starting circuit via contacts 152, 153, and via contacts 154 and 155 places positive battery on the system which effects the following circuit operations: extends positive battery to relay 310 and to the wiper of switch bank 300A via contacts 155, 154, 242, 241, 274, 273, and the "Pulse" lead. Relay 310 operates and opens its contacts 311 and 312, this opens a circuit to motor magnet 300. The positive battery on the wiper of switch 300A is extended to the series connected "Stop" relay 430 and "Start" relay 420 via bank contact 1, winding number 1 of "Stop" relay 430, and "Start" relay 420; relay 420 operates and closes contacts 421 and 422 of micro-switch 423; this completes a circuit to, and energizes motor start relay 400; pump motor number 1 starts and starter 400 locks up to A. C. ground via contacts 401, 402, 416, 417, 434 and 433; relay 430 simultaneously operates with relay 420, and via contacts 431, 432 extends positive battery to, and lights, "Motor Operating Lamp 1"; via contacts 433, 434 of micro-switch 435 completes the previously mentioned motor starter lock-up circuit to A. C. ground; via contacts 436, 437 extends positive battery (standing on the "Lock" lead) to the number 2 winding of relay 430 causing it to lock up; via contacts 439, 438 extends positive battery to, and marks, the number 1 contact of the "Busy" switch bank 300B, and through contacts 454, 455 of the "Out-In" switch 450 marks contact 1 of the "Busy" switch bank 320B.

The previously mentioned system positive battery is also simultaneously extended via contacts 155, 154, 271 and 269 to winding 1 of the timer circuit initiating relay 250, which, upon operating, closes contacts 253, 254 to prepare a locking circuit to winding 2; contacts 251, 252 close and extend positive battery via contacts 221, 222 to slow-releasing timer relay 200; relay 200 operates and closes contacts 202, 201 to extend positive battery to slow-releasing relay 210. Upon operating, relay 210 shunts down relay 200 by placing positive battery on its negative lead via contacts 211, 212, and after approximately 500 milli-seconds relay 200 restores and closes contacts 202, 203 to extend positive battery to motor magnet 220 via contacts 214, 213. Motor magnet 220 operates and at its contacts 221, 222 opens the energizing circuit of relay 200; and at contacts 223, 224 opens its presently ineffectual homing circuit. Also upon the restoration of relay 200, the energizing circuit of relay 210 is opened at contacts 201, 202. After a short interval of time slow-releasing relay 210 restores and at its contacts 213, 214 opens the energizing circuit of motor magnet 220, which, restores; whereupon, the wiper of switch 220A is stepped to its number 1 contact and off-normal springs 225, 226 close and prepare the homing circuit for motor magnet 220, and off-normal springs 227, 228 close causing the presently energized timer initiating relay 250 to lock up to positive battery via contacts 253, 254, 227 and 228, and contacts 223, 224 close to further prepare the before-mentioned homing circuit, and contacts 221, 222 close and initiate another cycle of operation of relays 200, 210, and motor magnet 220 to step the wiper of switch 220A to the number 2 bank contact. It takes approximately one second for the wiper of switch 220A to step from one to an adjacent, succeeding, bank contact. Approximately two seconds after the timer commenced, positive battery was placed on relay 240 via contacts 202, 203, 214, 215, and the wiper and contact 2 of switch 220A.

Upon operating, relay 240 closes its contact 243, 244 to complete a holding circuit, via contacts 227, 228, to positive battery; and opens its contacts 241, 242, this deenergizes relay 310 and also removes the system positive battery from the wiper of switch 300A. Removal of positive battery from the wiper of switch 300A deenergizes, via contact 1, the number 1 winding of "Stop" relay 430 and the "Start" relay 420. Relay 420 restores, and since relay 430 is locked up to the positive battery "Lock" lead it is unaffected, and neither of these relays affect the operation of motor starter 400 which is locked up to A. C. ground. "Start" relay 420 was energized for approximately two seconds before being deenergized by the action of the timer circuit—this insures complete operation and lock-up of motor starter 400. Upon deenergizing, relay 310 closes its contacts 311, 312 and completes an energizing circuit to motor magnet 300, which, upon operating, opens its interrupter contacts 301, 302 and also steps the ganged wipers of switches 300A, 300B, and 300C to their respective number 2 contacts; since contact 2 of switch 300B is unmarked the wipers will stop on their respective number 2 contacts. The wiper of timer switch 220A steps along as above described and when it reaches contact 6—approximately six seconds after commencement, which period allows the pump motor to come up to speed and build up pressure—an energizing circuit is extended to relay 260 via contacts 267, 266 and also to relay 330 via the "Start" lead. Relay 260 operates and effects the following circuit operations: closes its first to operate contacts 264, 265 which lock up relay 260 to positive battery through contacts 154, 155; opens the initial energizing circuit to relay 150 at contacts 275, 276; opens contacts 266, 267 to open the initial energizing circuit of relay 260; opens contacts 271, 269 to open the energizing circuit to winding 1 of relay 250 which is presently locked up at its number 2 winding; closes contacts 269, 268 to prepare an energizing circuit to winding 1 of relay 250 via the "Increase Pulse" lead as hereinafter more fully described; opens contacts 273, 274 and closes contacts 273, 272, this transfers the "Pulse" lead to the positive battery circuit of the "Increase Pulse" lead; and closes contacts 261, 262 of micro-switch 263 to place A. C. ground on the "Open" motor starter 171.

The previously closed by-pass valve will open upon energization of the "Open" motor starter 171 which is energized via the following path: A. C. ground on contact 114 through contacts 113, 143, 142, 173 and 172 of the "First" flow meter, 262, 261, 166 and 167 of limit switch 165 to the "Open" motor starter 171. When the by-pass valve is moved to its extreme open position, contacts 166, 167 of limit switch 165 open and release "Open" starter 171; contacts 161, 162 of limit switch 160 open to open the initial energizing circuit to relay 150; and contacts 163, 164 close to prepare a circuit to the "Close" relay 170. Water is now flowing through the by-pass valve and building up volume; when the volume reaches a predetermined value the first flow meter contact 173 (Fig. 1) moves from the "Low" to the "High" position, then A. C. ground (previously traced from contact 114) energizes the "Close" starter via contacts 173, 174 and 163, 164 of limit switch 160. The by-pass valve now closes for the remaining duration of automatic operation.

When relay 260 operated and locked up, positive battery was also extended to relay 330 via the "Start" lead, contacts 344, 343, 321, and 322 to prepare the "Motor Stop Switch" circuits. Upon operating, slow-releasing relay 330 closes its contacts 331, 332 and extends positive battery to motor magnet relay 320. Relay 320 operates and opens contacts 321, 322 to interrupt the energizing circuit of slow-releasing relay 330, which, upon restoring, opens the energizing circuit of magnet 320 at contacts 331, 332. And upon restoring, motor magnet 320 steps the wipers of switches 320A and 320B to their respective number 1 contacts. Positive battery is encountered on the number 1 contacts of "Busy" switch 320B and an energizing circuit is completed to relay 340, which operates, and effects the following circuit operations: closes contacts 341, 342 to extend positive battery to, and prepare, the "Decrease Stop Pulse" circuit leading to relay 680; opens contacts 343, 344 to open the energizing circuit of relay 330; and closes contacts 345, 346 to prepare the "Decrease Pulse" circuit, as hereinafter fully described. (If positive battery was not encountered on contact 1 of switch 320B, relays 330 and 320 would continue to interact and step the ganged wipers of switches 320A and 320B until positive battery is encountered.) When motor 1 started positive battery was placed on contact 1 of the "Busy" switch 320B, and approximately a little more than six seconds afterward, the two ganged wipers of switches 320A and 320B were positioned on their respective number 1 contacts in preparation for the stopping of motor 1 via "Stop" switch 320A, as hereinafter fully described.

The timer switch 220A continues stepping until it reaches its home position (N), whereupon, off normal contacts 227, 228 open and remove positive battery from winding 2 of relay 250, which deenergizes and opens its contacts 251, 252 to stop the timing circuit.

As a résumé, the number 1 pump has been automatically placed in operation, and positive battery has been placed on contacts 1 of the "Busy" bank switches 300B and 320B.

The opening of a valve in the hydraulic system will permit an additional flow of water if desired, and when the new volume of water flowing into the hydraulic system reaches a predetermined value the second flow meter contact 602 moves from the "Low" to the "High" position and completes an energizing circuit to the A. C. relay 610. The circuit arrangement shown in Figure 6 is basically an "add and subtract relay chain" that converts a switching change in a pair of flow meter contacts into a single impulse for starting or stopping a pump motor as hereinafter fully described. Upon operating, relay 610 closes its contacts 611, 612 to extend the system positive battery to the "Increase Pulse" relay 620 via contacts 631, 632. Relay 620 operates and effects the following circuit operations: closes contacts 621, 622 to extend positive battery to relay 630 via contacts 641, 642; closes contacts 623, 624 to lock up relay 620 to positive battery via the "Increase Stop Pulse" lead and contacts 241, 242; and closes contacts 625, 626 to prepare circuits to relay 310 and the wiper of switch 300A via the "Pulse" lead and contacts 272, 273 and to the timer initiating relay 250 via contacts 268, 269.

Relay 630 operates and effects the following circuit operations: closes contacts 632, 633 to transfer and reprepare the initial energizing circuit of the presently energized "Increase Pulse" relay 620 from the control of relay 610 to the control of relay 650—this newly prepared circuit is via contacts 632, 633, 662 and 661 to contact 651; closes contacts 635, 634 to prepare an energizing circuit to the "Decrease Pulse" relay 680, the operation of which will be fully described hereinafter; closes contacts 636, 637 to prepare an energizing circuit to relay 640 and the presently energized relay 630; and closes contacts 638, 639 to extend positive battery to relay 310 and the wiper of switch 300A via contacts 647, 648, 639, 638, 625, 626, 272 and 273; positive battery is also extended to the timer initiating relay 250 via contacts 647, 648, 639, 638, 625, 626, 268 and 269. Both the number 2 motor in the automatic sequence and the timer now commence operation as hereinafter described.

Relay 310 operates and opens its contacts 311 and 312 to open a circuit to motor magnet 300. The positive battery on the wiper of switch 300A is extended to the series connected "Stop" relay 480 and "Start" relay 470 via bank contact 2, winding number 1 of "Stop" relay 480, and "Start" relay 470; relay 470 operates and closes contacts 471 and 472 of micro-switch 473; this completes a circuit to, and energizes, motor starter relay 460; pump motor 2 starts and starter 460 locks up to A. C. ground via contacts 461, 462, 441, 442, 481 and 482; relay 480 simultaneously operates with relay 470, and via contacts 483, 484 lights "Motor Operating Lamp 2"; via contacts 481, 482 of micro-switch 485 completes the previously mentioned motor starter lock-up circuit to A. C. ground; via contacts 486, 487 extends positive battery (standing on the "Lock" lead) to the number 2 winding of relay 480 causing it to lock up; via contacts 488, 489 extends positive battery to, and marks, the number 2 contact of the "Busy" switch bank 300B, and through contacts 494, 495 of the "Out-In" switch 490 contact 2 of the "Busy" switch bank 320B of the "Motor Stop Switch."

When the wipers of timer switch 220A reaches its second contact positive battery is extended to relay 240 which operates and closes its lock-up contacts 243, 244 and open its contacts 241, 242 to open the lock circuit to the "Increase Pulse" relay 620. Relay 620 restores and opens contacts 621, 622 to open the initial energizing circuit to relay 630, whereupon, relay 630 remains operated by locking up in series with relay 640 to positive battery; contacts 623, 624 open to further open the lock-up circuit to relay 620; and contacts 625, 626 open to remove positive battery from the wiper of switch 300A and relay 310 and from winding 1 of the timer initiating relay 250. Upon operating, relay 640 closes contacts 642, 643 to prepare an energizing circuit to relay 660 via contacts 642, 643, 672 and 671; contacts 644, 645 close and prepare a decrease circuit, as hereinafter described; and contacts 647, 646 close and transfer positive battery from the previously opened circuit leading to the "Pulse" lead to a prepared circuit leading to the "Decrease Pulse" lead.

If there is a further increase in the volume of water used, the third flow-meter contact 603 will operate and energize relay 650 to again initiate operation of the "Increase Pulse" relay 620, and relays 660 and 670 will function and place the succeeding pump motor of the sequence in operation.

It is to be noted that in the 11 point stepping switch assembly denoted "Motor Start Switch" and comprising banks 300A, 300B and 300C the 11th contacts of banks 300A and 300C are not in use, and that the 11th contact of "Busy" bank 300B is connected to the four paralleled break contacts of the "Stop" relays associated with motors 1, 2, 3 and 4; the armature contacts associated with these break contacts are connected to positive battery. After the fifth motor has been started the ganged wipers will be stepped to their respective 11th contacts because of the presence of positive battery on the contacts of bank 300B, and then when any one of the remaining motors is not in operation positive battery will be extended to contact 11 of bank 300B and step the wipers to their respective number 1 contacts, additional stepping of the wipers can then be effected.

Assuming that there are three pump motors in operation, if the volume of water being used is suddenly diminished appreciably the third flow meter contact 603 will open and open the energizing circuit of relay 650.

Relay 650, upon restoring, extends the system positive battery to the "Decrease Pulse" relay 680 via contacts 155, 154, 652, 653, 666, 665, 691, 692, 693 and 694. Upon operating, relay 680 effects the following circuit operations: lock-up contacts 686, 685 close and extend positive battery, which is on the "Decrease Stop Pulse" lead, to relay 680; contacts 683, 684 close and extend positive battery to winding 2 of the "Stop" relay 430 to shunt it down and stop motor 1, this is via contacts 676, 675, 683, 684, the "Decrease Pulse" lead, 346, 345, and the wiper and number 1 contact of "Stop" switch 320A to the negative battery lead connected to winding 2 of relay 430; and contacts 681, 682 close and extend negative battery to shunt down relay 660 via contacts 682, 681, 695, 696, 697, 698, 674, and 673 to the junction of the path connecting relays 660 and 670. "Stop" relay 430, upon restoring, effects the following circuit operations: opens the lock-up circuit of motor starter 400 at contacts 433, 434, thereby stopping pump motor 1, the first motor started, and also opening the lock-up contacts 401, 402 of the motor starter 400; opens the circuit to the number 1 "Motor Operating Lamp" at contacts 431, 432; opens the lockup circuit to winding 2 at contacts 436, 437; and opens contacts 438, 439 to remove positive battery from the number 1 contacts of the "Busy" switches 300B and 320B. The removal of positive battery from contacts 1 of the "Busy" switch 300B is ineffectual at this time; but the removal of positive battery from contacts 1 of switch 320B will cause relays 320 and 330 to interact, as previously described, and step the ganged wipers of switches 320A and 320B until positive battery is encountered on a succeeding contact of switch 320B, which contact marks the second motor that was started. When relay 660 was shunted down it effected the following circuit operations: closed contacts 661, 662 to re-prepare the energizing circuit to the "Increase Pulse" relay 620, which is under the control of the third flow-meter contact 603; closed contacts 664, 665 to re-prepare the energizing circuit to the "Decrease Pulse" relay 680; opened its lock-up contacts 667, 668; and opened contacts 669 to reprepare an energizing circuit leading to the "Pulse" lead and for operating the next pump motor in the sequence.

Figure 5:
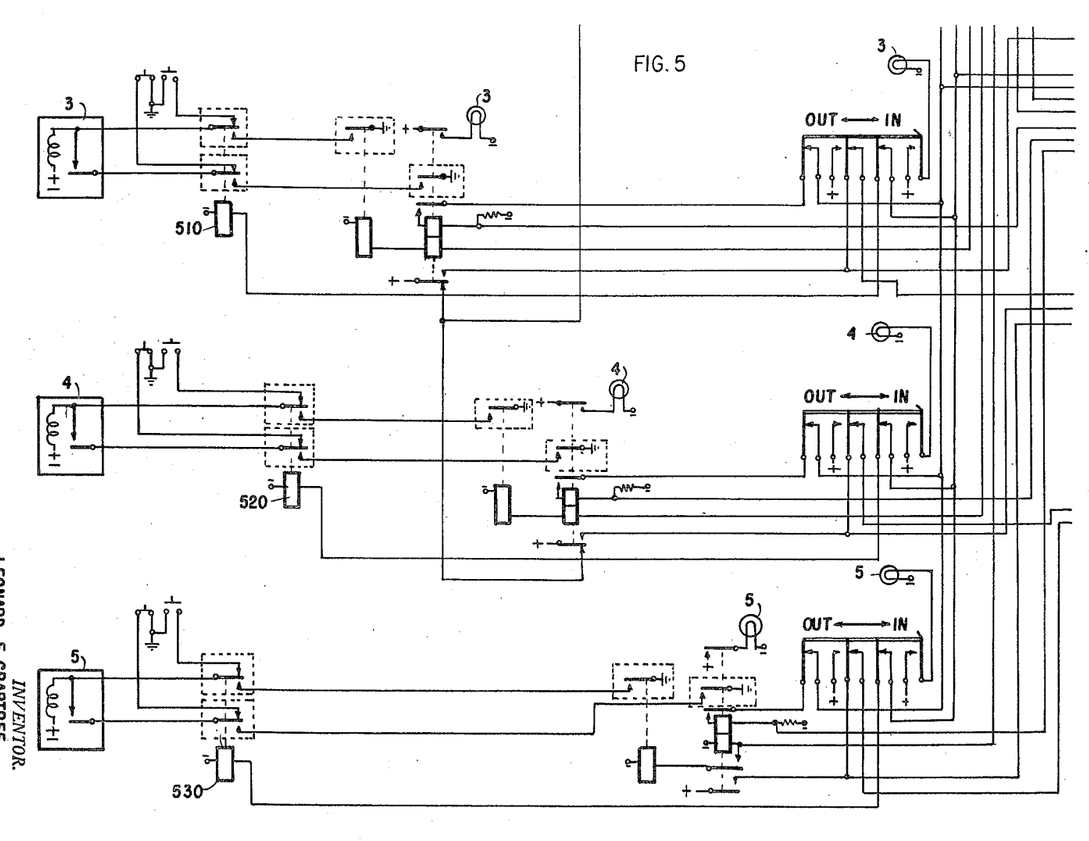

The "Out-In" key switch 450 is one of five similar key type switches shown in Figures 4 and 5, which, when operated before the initiation of automatic operation, cut their related motors out of automatic operation. When switch 450 is moved to the "Out" position before automatic operation, the following circuit operations are effected: contacts 451, 452 open to open the lock-up circuit of "Stop" relay 430; contacts 454, 455 open to open the positive battery marking circuit leading to contact 1 of "Busy" switch 320B; contacts 453, 454 close and extend positive battery to contact 1 of "Busy" switch 300B, thus marking motor 1 as though it is busy; opens contacts 456, 457 to open the energizing circuit to the motor starter transfer relay 410; and closes contacts 458, 459 to light the number 1 "Out" lamp. Should switch 450 be moved to the "Out" position while motor 1 is running, the motor will not stop because the transfer of the motor starter lock-up circuit at contacts 415, 416 of micro-switch 418 is very fast and the starter 400 will immediately re-lock to A. C. ground standing on switch 406. If it is desired to cut motor 1 out of service while it is running under automatic operation, switch 406 must also be depressed after the actuation of switch 450, thus preventing the motor starter from re-locking to A. C. ground.

The automatic control system and the motors operating thereunder may be stopped by depressing "Stop" push-button switch 120 which deenergizes relay 140 and slow-releasing relay 130. Relay 140 opens its contacts 142, 143 to deenergize relay 150, which opens its contacts 154, 155 to remove positive battery from the automatic control system and release all relays previously energized thereby, this causes the "Stop" relays, such as relay 430, to restore and open the energizing circuit of their respective motor starters, such as starter 400, thus stopping the motors. Upon being deenergized, slow-releasing relay 130 holds the motor starter transfer relays, such as relay 410, operated for approximately 500 milliseconds to allow the motor starters to fully restore and not re-lock to A. C. ground standing on the manual "Stop" switches, such as switch 406.

In the event of a D. C. power failure the automatic system will stop, but the motor starters then energized will remain energized by immediately relocking to the manual A. C. "Stop" switches.

*Manual operation*

To put the system on manual operation push-key 100 must be placed in the "Manual" position. The automatic control circuit is then inoperative and the motors are only under the control of the "Manual," "Start" and "Stop" push-button switches, such as switches 405, 406.

It is to be noted that, if desired, any of the motors may be operated manually during the automatic operation of the system if the motor is first removed from the control of the automatic system, as previously described.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what I claim and desire to have protected by issuance of Letters Patent of the United States is:

1. In an automatic control system, a plurality of apparatus units, means for starting said units, means for stopping said units including a pair of rotary switches, a motor relay associated with each of said switches for operating said switches, each relay having a pair of first break contacts, a slow-releasing relay having a pair of first make contacts, another relay having a pair of second make contacts and a pair of second break contacts, an energizing circuit for said slow relay, said circuit being connected through said first and second break contacts, an energizing circuit for one of said motor relays, said last circuit being connected through said first make contacts, a third energizing circuit for said other relay, said third circuit being connected through one of said rotary switches, and a stopping circuit for said units, said stopping circuit being connected through said second make contacts and said other rotary switch.

2. An automatic control circuit for a plurality of apparatus units having flow meter contacts controlling the said units, a pair of rotary switches, a starting circuit for each unit and a stopping circuit for each unit, said starting circuits connected to one rotary switch and said stopping circuits connected to the other of said switches, means controlled over said one rotary switch for starting said units in sequence over said starting circuits and for thereby causing operation of said flow meter contacts to cause step-by-step operation of said both of said switches, means controlled over said other switch for controlling said stopping circuits to stop said units, a timer device for controlling said starting circuits including a stepping switch having a plurality of fixed contacts and a motor magnet therefor, a first and a second slow releasing relay for controlling said motor magnet, means for energizing said first slow relay, contacts operated by said first slow relay for causing the energization of said second slow relay, contacts on said second slow relay for causing the deenergization of said first slow relay, a circuit for said motor magnet completed only after the second slow relay has energized and the said first slow relay has deenergized, a relay having contacts in said starting circuits, a circuit for said last relay completed over one of said fixed contacts only when the switch has been operated a predetermined number of steps by said motor magnet, said slow relays interacting to control said motor magnet to cause operation of said last relay only after a predetermined time, and a circuit for said last relay completed only when both said slow relays are deenergized.

3. An automatic control system as claimed in claim 2 including two manually operated push buttons, one of said push buttons having a conductor connected to a rotary magnet of said one rotary switch, said other push button being connected to one of the wipers of said one rotary switch, a plurality of bank contacts accessible to said one wiper, a lamp connected to each contact of the last-mentioned bank, whereby by the manually depression of said second push button lights the lamp connected to the contact corresponding to the apparatus unit that the wiper is engaging at that time, operation of said first push button energizing the rotary magnet and rotating said wipers to the contact desired as determined by the amount of times the button is depressed.

4. An automatic control system for a plurality of apparatus units having a series of contacts for controlling said units, a pair of rotary switches, a pair of motor magnets with one associated with each of said switches for stepping said switches, a starting circuit for each unit and a stopping circuit for each unit, said starting circuits connected to one rotary switch and said stopping circuits connected to the other of said switches, means controlled over said contacts for starting the operation of said switches by operating said motor magnets, means controlled by said contacts for controlling the starting circuits of said units in sequence as said one switch is stepped by one of said motor magnets from one of said starting circuits to another to sequentially operate successive ones of said apparatus units and said successive operation of said apparatus units thereby causing operation of said contacts to cause step-by-step operation of both of said switches by both motor magnets, and means controlled by a change in the operated condition of said contacts for controlling said stopping circuits over said other switch to stop said units in the same order in which said units were started.

5. An automatic control system as claimed in claim 4, including a timer device for controlling said starting circuits including a stepping switch havng a plurality of fixed contacts and a third motor magnet therefor, a first and a second slow-releasing relay for controlling the said third motor magnet, means for energizing said first slow relay, contacts operated by said first slow relay for causing the energization of said second slow relay, contacts on said second slow relay for causing deenergization of said first slow relay, a circuit for said third motor magnet completed only after the second slow relay has energized and the first slow relay has deenergized, a relay having contacts in said starting circuits, a circuit for said last relay completed over one of said fixed contacts only when the switch has been operated a predetermined number of steps by said third motor magnet, said slow relays interacting to control said third motor magnet to cause operation of said last relay only after a predetermined time, and a circuit for said last relay completed only when both said slow relays are deenergized.

6. In a flowage control system, a plurality of flowage control units each having a starting circuit and a stopping circuit, a first step-by-step switch having successive bank contacts terminating successive ones of said starting circuits, a second step-by-step switch having successive bank contacts terminating successive ones of said stopping circuits, flow-meter contacts operative in accordance with the demand for increase or decrease flowage, means responsive to the operation of said flow-meter contacts calling for an increase flowage for operating said first switch to connect with successive ones of said starting circuits to start successive ones of said flowage control units, means for stepping said second switch to connect with the stopping circuit of the first of said flowage control units after said first unit is started in operation, a third switch operative each time a flowage control unit is started for delaying the completion of the starting circuit for a succeeding flowage control unit for a predetermined time to permit the last operated flowage control unit to build up to its maximum power to increase flowage, and means responsive to the operation of said flow-meter contacts calling for a decrease flowage for completing the stopping circuit for said first operated flowage control unit by way of said second switch to stop said first operated flowage control unit.

7. In a flowage control system as claimed in claim 6, wherein said first and said last means includes a chain of counting relays operative in one direction in response to said flow-meter contacts calling for an increase flowage to control stepping of said first switch and operative in a reverse direction in response to said flow-meter contacts calling for a decrease flowage to control the completion of the stopping circuit for said first operated flowage control unit.

References Cited in the file of this patent

UNITED STATES PATENTS

| | | |
|---|---|---|
| 1,750,161 | Deans et al. | Mar. 11, 1930 |
| 2,158,887 | Sweet | May 16, 1939 |
| 2,244,880 | Howse | June 10, 1941 |
| 2,458,683 | Cowherd et al. | Jan. 11, 1949 |
| 2,486,256 | Buck | Oct. 25, 1949 |
| 2,526,646 | Ericson | Oct. 24, 1950 |
| 2,741,986 | Smith | Apr. 17, 1956 |